(12) United States Patent
Bennett, III et al.

(10) Patent No.: US 7,116,762 B2
(45) Date of Patent: Oct. 3, 2006

(54) HOME OFFICE COMMUNICATION SYSTEM AND METHOD

(75) Inventors: Raymond Walden Bennett, III, Naperville, IL (US); Robert Wesley Bossemeyer, Jr., St. Charles, IL (US); Wayne Robert Heinmiller, Elgin, IL (US); Jordan Howard Light, Mt. Prospect, IL (US)

(73) Assignee: SBC Properties, L.P., Reno, NV (US)

( * ) Notice: Subject to any disclaimer, the term of this patent is extended or adjusted under 35 U.S.C. 154(b) by 619 days.

(21) Appl. No.: 09/789,421

(22) Filed: Feb. 20, 2001

(65) Prior Publication Data

US 2003/0036908 A1    Feb. 20, 2003

Related U.S. Application Data

(63) Continuation of application No. 09/103,825, filed on Jun. 24, 1998, now Pat. No. 6,230,133.

(51) Int. Cl.
*H04M 1/64* (2006.01)
*G10L 21/00* (2006.01)

(52) U.S. Cl. ............... 379/88.04; 704/270; 704/201; 709/225; 709/206; 370/354; 370/352

(58) Field of Classification Search ........ 704/270–275, 704/500, 201; 379/88.01–88.14, 58, 67, 379/89; 370/354, 431, 352, 345, 259; 345/462, 345/535; 709/225, 206; 358/402
See application file for complete search history.

(56) References Cited

U.S. PATENT DOCUMENTS

| | | | |
|---|---|---|---|
| 5,187,735 A | 2/1993 | Herrero Garcia et al. | |
| 5,193,110 A | 3/1993 | Jones et al. | |
| 5,479,411 A | 12/1995 | Klein | |
| 5,479,491 A | 12/1995 | Herrero Garcia et al. | |
| 5,497,373 A | 3/1996 | Hulen et al. | |
| 5,568,536 A | 10/1996 | Tiller et al. | |
| 5,568,540 A | 10/1996 | Greco et al. | |
| 5,633,916 A | 5/1997 | Goldhagen et al. | |
| 5,666,357 A * | 9/1997 | Jangi | 370/345 |
| 5,675,507 A | 10/1997 | Bobo, II | |
| 5,812,639 A | 9/1998 | Bartholomew et al. | |
| 6,025,931 A * | 2/2000 | Bloomfield | 358/402 |
| 6,044,403 A | 3/2000 | Gerszberg et al. | |
| 6,078,338 A * | 6/2000 | Horan et al. | 345/535 |
| 6,101,182 A * | 8/2000 | Sistanizadeh et al. | 370/352 |

(Continued)

OTHER PUBLICATIONS

Paula Bernier and Ken Branson, *Vienna Gamers Two Gateway Deals*, Sounding Board, vol. 1, No. 1, May-Jun. 1998, p. 20.

*Primary Examiner*—Vijay B. Chawan
(74) *Attorney, Agent, or Firm*—Hanley, Flight & Zimmerman, LLC (57) ABSTRACT

A home office communication system (10) has a control and display system (16). A modem (12) is controlled by the control and display system (16) and connected to a telephone line (14). A multiplexer (18) is connected to the modem (12) and multiplexes a plurality of outgoing data streams in a predefined format and demultiplexes an incoming data stream from the modem (12). A speech encoding system (20) generates a plurality of speech packets to form one of the plurality of outgoing data streams. A telephone line control system (22) generates a plurality of control packets forming one of the plurality of outgoing data streams and an information channel (24) forms one of the plurality of outgoing data streams.

21 Claims, 9 Drawing Sheets

U.S. PATENT DOCUMENTS

| | | | |
|---|---|---|---|
| 6,230,133 B1 * | 5/2001 | Bennett et al. | 704/270 |
| 6,285,680 B1 * | 9/2001 | Steinka et al. | 370/431 |
| 6,359,881 B1 * | 3/2002 | Gerszberg et al. | 370/354 |
| 6,438,217 B1 * | 8/2002 | Huna | 379/88.14 |
| 6,532,230 B1 * | 3/2003 | Lung et al. | 370/352 |
| 2001/0012286 A1 * | 8/2001 | Huna et al. | |

* cited by examiner

HOME OFFICE COMMUNICATION SYSTEM AND METHOD

This is a continuation of U.S. application Ser. No. 09/103,825, filed on Jun. 24, 1998, now U.S. Pat. No. 6,230,133, which application is hereby incorporated by reference herein.

FIELD OF THE INVENTION

The present invention relates generally to communication systems and more particularly to a home office communication system and method.

BACKGROUND OF THE INVENTION

An executive working from home or his hotel room, commonly needs to communicate with his office. This can include calling for voice mail messages, downloading email messages, receiving faxes and talking to his coworkers. In addition, the executive may need to download files from the company's project server. Commonly it will require a separate call to get the voice mail messages, email messages, faxes and telephone conversations. In addition, these telephone call may each be long distance telephone calls.

Thus there exists a need for a home office communication system that does not require multiple telephone calls to receive voice mail messages, email messages, faxes and telephone conversations.

DETAILED DESCRIPTION OF THE DRAWINGS

A home office communication system that overcomes these and other problems has a control and display system. A modem is controlled by the control and display system and connected to a telephone line. A multiplexer is connected to the modem and multiplexes a plurality of outgoing data streams in a predefined format and demultiplexes an incoming data stream from the modem. A speech encoding system generates a plurality of speech packets to form one of the plurality of outgoing data streams. A telephone line control system generates a plurality of control packets forming one of the plurality of outgoing data streams and an information channel forms one of the plurality of outgoing data streams. The system allows a worker at home to have a telephone conversation with the office while downloading his email over the information channel. The multiplexer intelligently combines the data streams over a single telephone line. This eliminates the need to place a separate telephone call to pickup email and voice mail messages or to have a telephone conversation with a co-worker.

Figure 1:
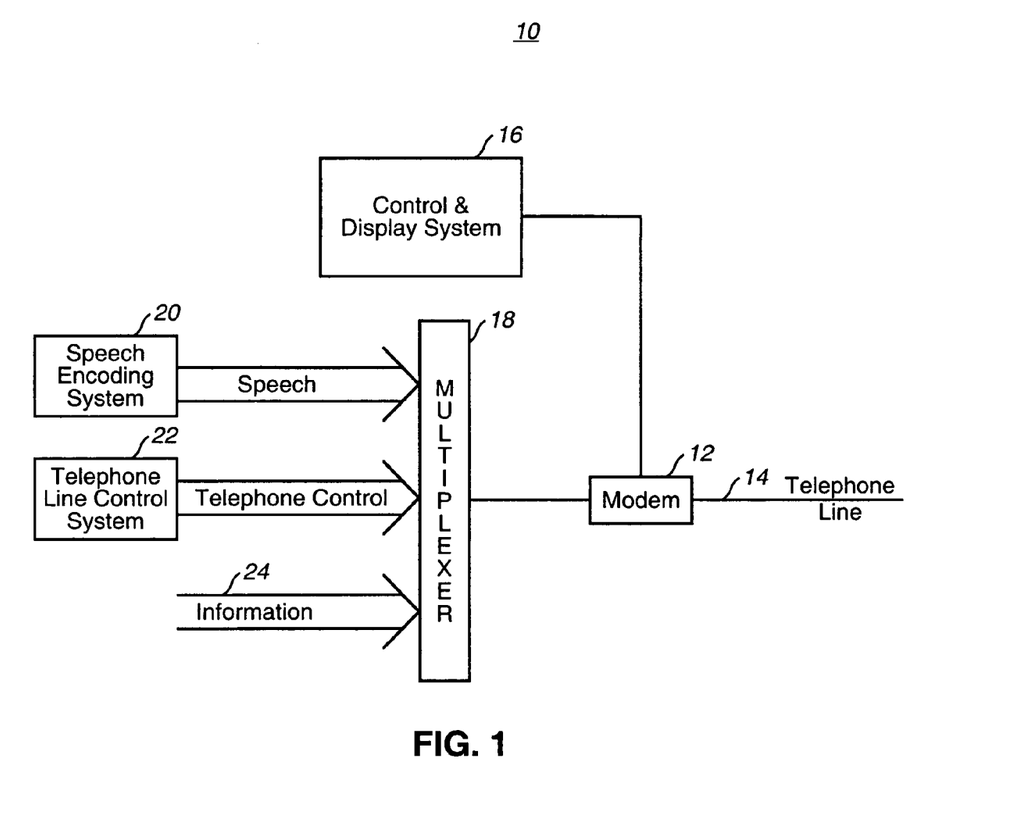
FIG. 1 is a block diagram of a home office communication system in accordance with one embodiment of the invention.

FIG. 1 is a block diagram of a home office communication system 10 in accordance with one embodiment of the invention. A modem 12 is connected to a telephone line 14. The modem 12 is controlled by a control and display system 16. A multiplexer 18 is connected to the modem 12. The multiplexer 18 multiplexes a plurality of outgoing data streams and demultiplexes an incoming data stream. A speech encoding system 20 generates a plurality of speech packets (plurality of voice packets) that are sent to the multiplexer 18. A telephone line control system 22 generates a plurality of control packets that are sent to the multiplexer 18. In one embodiment the multiplexer applies a control tag to each of a plurality of control packets. An information channel 24 is connected to the multiplexer 18. The information channel would include email information (email message), information from a project server and information from web sites.

Figure 2:
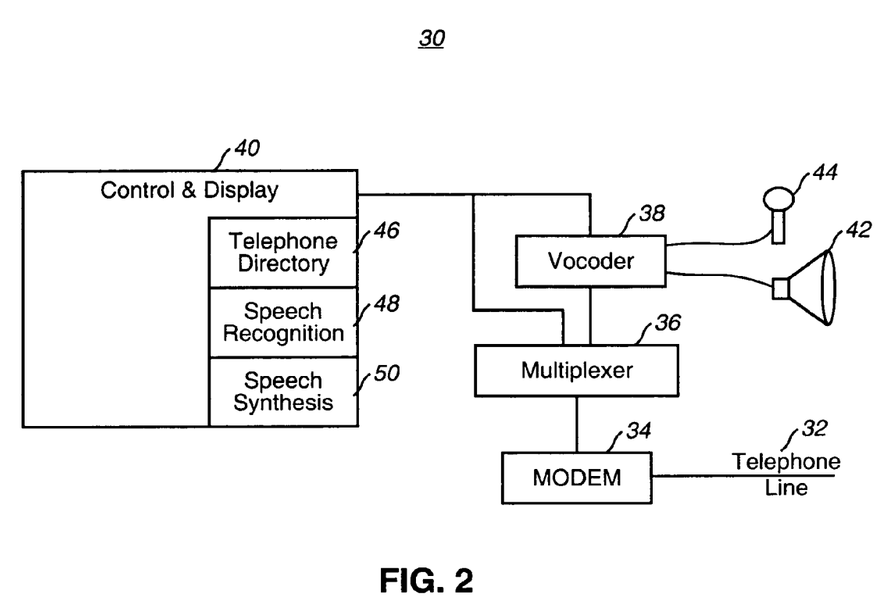
FIG. 2 is a block diagram of a home office communication system in accordance with another embodiment of the invention.

FIG. 2 is a block diagram of a home office communication system 30 in accordance with another embodiment of the invention. A telephone line 32 is connected to a modem 34. The modem 34 is connected to a multiplexer 36. The multiplexer 36 is connected to a vocoder 38 and a control and display system 40. A speaker 42 receives incoming audio signals from the vocoder 38. A microphone 44 sends an audio signal to the vocoder 38. The control and display system 40 includes a telephone directory 46, a speech recognition system 48 and a speech synthesis system 50. The telephone directory 46 allows a user to automatically dial co-workers. The speech recognition system 48 allows a user to voice commands and the speech synthesis system 50 allows the system to function as an electronic receptionist for incoming calls.

In one embodiment the multiplexer 36 applies a speech tag to each of the plurality of speech packets from the vocoder 36. The multiplexer 36 also routes an incoming packet to the vocoder 36 when the incoming packet includes a speech tag.

Figure 3:
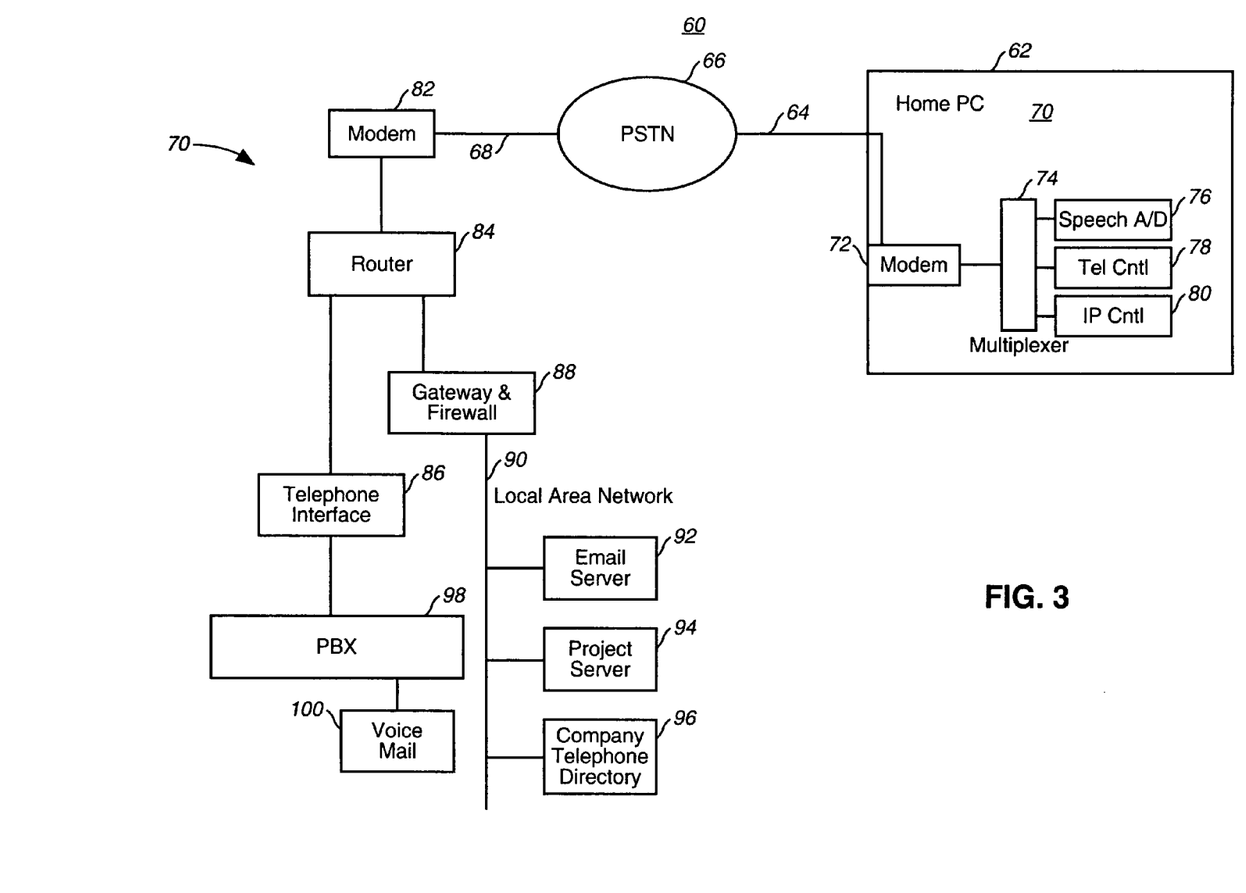
FIG. 3 is a block diagram of a home office communication system in accordance with another embodiment of the invention.

FIG. 3 is a block diagram of a home office communication system 60 in accordance with another embodiment of the invention. A home office system 62 is connected by a telephone line 64 through the public switched telephone network (PSTN) 66 and a second telephone line 68 to a base office system 70. In one embodiment the PSTN is replaced by the Internet. The home office system 62 includes a computer 71 having a modem 72 connected to a multiplexer 74. The multiplexer 74 is connected to an analog to digital converter 76 that converts audio signals from analog to digital signals. A telephone control module 78 and an information channel 80 are connected to the multiplexer 74. In one embodiment the home office system 62 communicates with the base office system 70 using an internet protocol.

The base office system 70 has a base modem 82 connected to a telephone line 68. A router 84 is connected to the base modem 82. The router 84 is connected to a telephone interface 86 and to a gateway (gateway and firewall) 88. The gateway and firewall 88 provides protection from hackers and other unauthorized users. In one embodiment the gateway and firewall provide protocol translations between a local area network 90 and the external world. The local area network 90 includes an email server 92, a project server 94 and a company telephone directory 96. The telephone interface 86 is connected to the private branch exchange (PBX) 98. The telephone interface converts between analog and digital telephone line standards. The PBX (telephone switch) 98 routes incoming calls throughout the office. The PBX (switch) 98 is also connected to a voice mail system 100. Telephone connections between the home office communication system 60 and another telephony device are established by the telephony interface 86 connected to some node in the PSTN (shown as PBX 98, although in other embodiments it could be a central office). As is know to those skilled in the art, the control signals passing between the telephony control system 78 and the telephony interface 86 can be defined to permit the establishment of as many types of telephony connections as are supported by the PBX 98 or other compatible PSTN node. Using this system an executive can place one phone call to his company and pickup email, voice mail, and information off of the company project server. In addition, the executive can have a telephone conversation with his co-workers. This system saves a user time and money, since a single phone line (telephone connection) can be used for all the functions listed above. In the prior art the executive would be required to make a separate telephone connection (telephone call) for each of the functions listed above.

Figure 4:
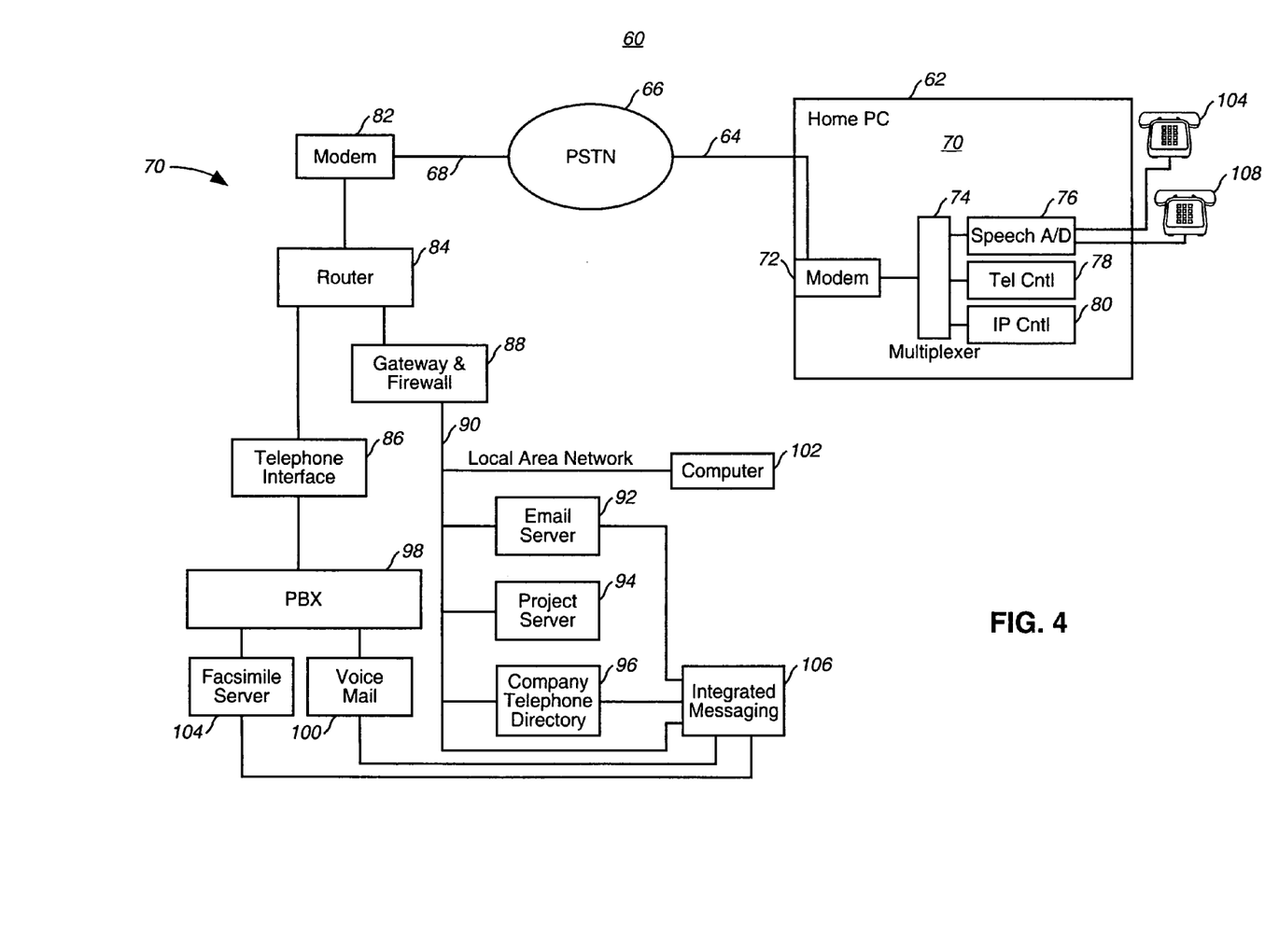
FIG. 4 is a block diagram of a home office communication system in accordance with another embodiment of the invention.

FIG. 4 is a block diagram of a home office communication system 60 in accordance with another embodiment of the invention. This embodiment is very similar to the embodiment of FIG. 3 except it shows a user's computer (target computer) 102 connected to the local area network 90, a facsimile server 104 and an integrated messaging center 106. In addition, the home office system 62 has a plurality of telephones 108 connected to the analog to digital converter 76. Depending on the type of telephone line 64 more simultaneous telephone channels can be sustained over the telephone line 64. For instance a Digital Subscriber Line (DSL) would allow more telephone channels than an analog telephone line.

The integrated messaging center 106 is connected to the local area network 90 and extracts header information from the email server 92, voice mail system 100 and the facsimile server 104. When a user picks up his messages, he receives a listing showing the type of message, who the message is from (sender's name) and title information. The integrated messaging center 106 in one embodiment uses an Optical Character Recognition (OCR) system to extract the sender information (sender's name and sender's telephone number) from faxes.

In one embodiment the home office system includes software for shared white-boarding applications. The home computer 70 and the target computer 102 show the same screen and both computers can input information into a common document. This makes it easy for a user to work on a document with a colleague while also having a telephone conversation to discuss the document.

Figure 5:
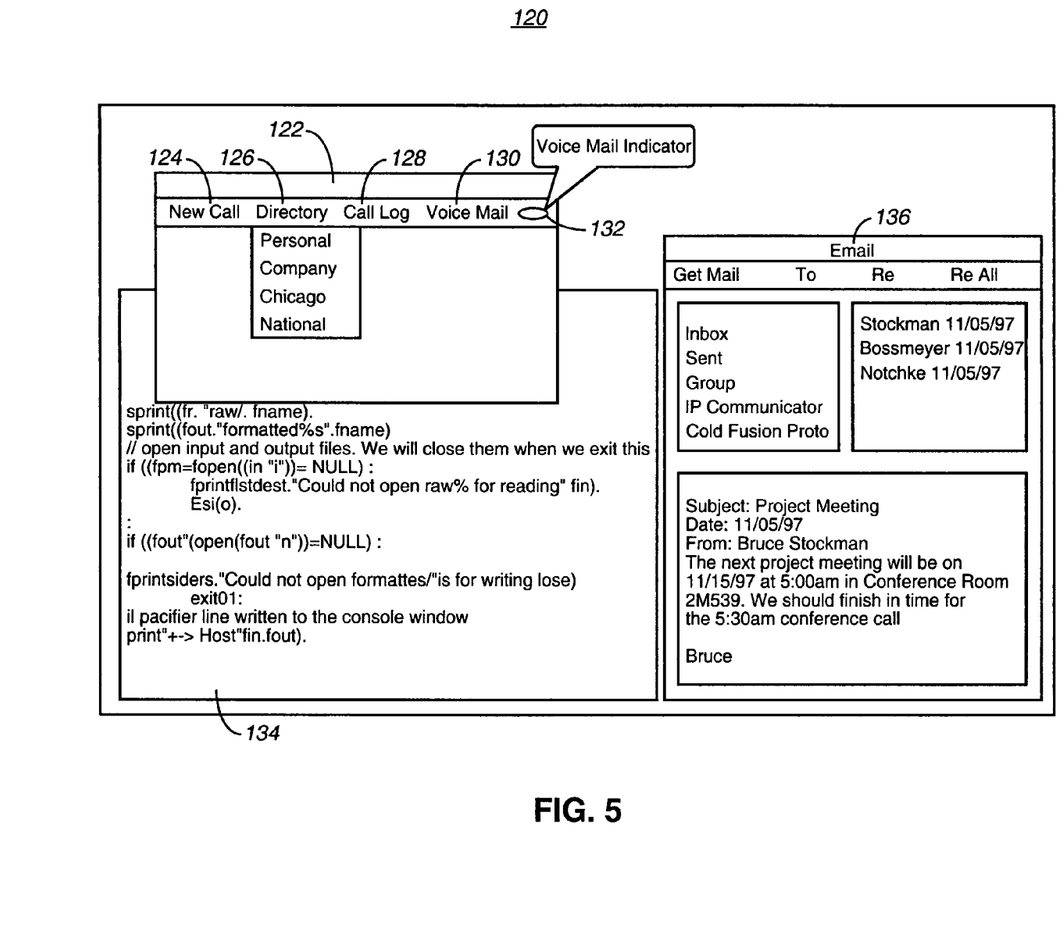
FIG. 5 is a schematic diagram of a display used with a home office communication system in accordance with one embodiment of the invention.

FIG. 5 is a schematic diagram of a display 120 used with a home office communication system in accordance with one embodiment of the invention. The display 120 shows a call window 122 having a new call header 124 for placing a call, a directory header 126, a call log header 128, a voice mail header 130 and a voice mail indicator 132. Below the call window 122 is a program listing 134 which has been downloaded from the project server and an email window 136.

Figure 6:
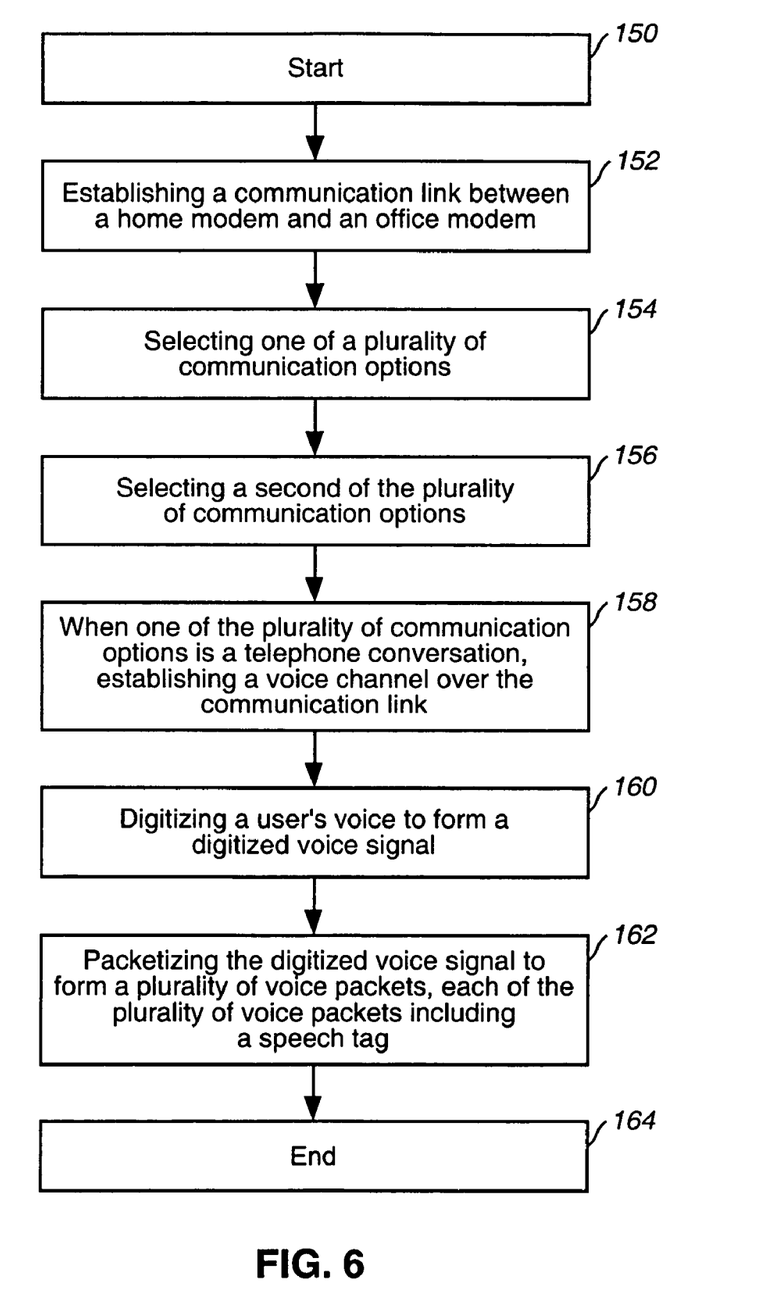
FIG. 6 is a flow chart of the steps used in a home office communication system in accordance with one embodiment of the invention.

FIG. 6 is a flow chart of the steps used in a home office communication system in accordance with one embodiment of the invention. The process starts, step 150, by establishing a communication link between a home modem and an office modem at step 152. Next, one of a plurality of communication options is selected at step 154. A second of the plurality of communication options is selected at step 156. When the one of the plurality of communication options is a telephone conversation, a voice channel is established over the communication link at step 158. A user's voice is digitized to form a digitized voice signal at step 160. At step 162, the digitized voice signal is packetized to form a plurality of voice packets. Each of the plurality of voice packets includes a speech tag, which ends the process at step 164.

Figure 7:
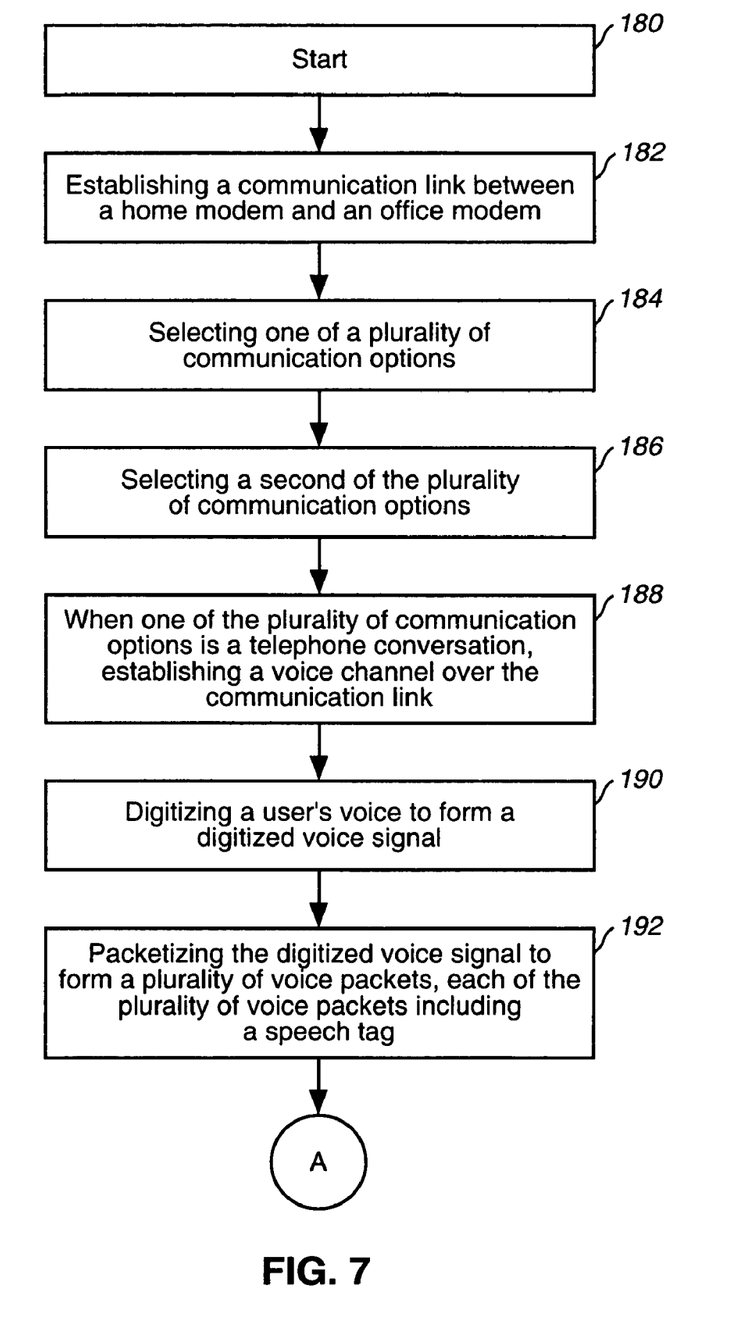
FIGS. 7 & 8 are a flow chart of the steps used in a home office communication system in accordance with another embodiment of the invention.
Figure 8:
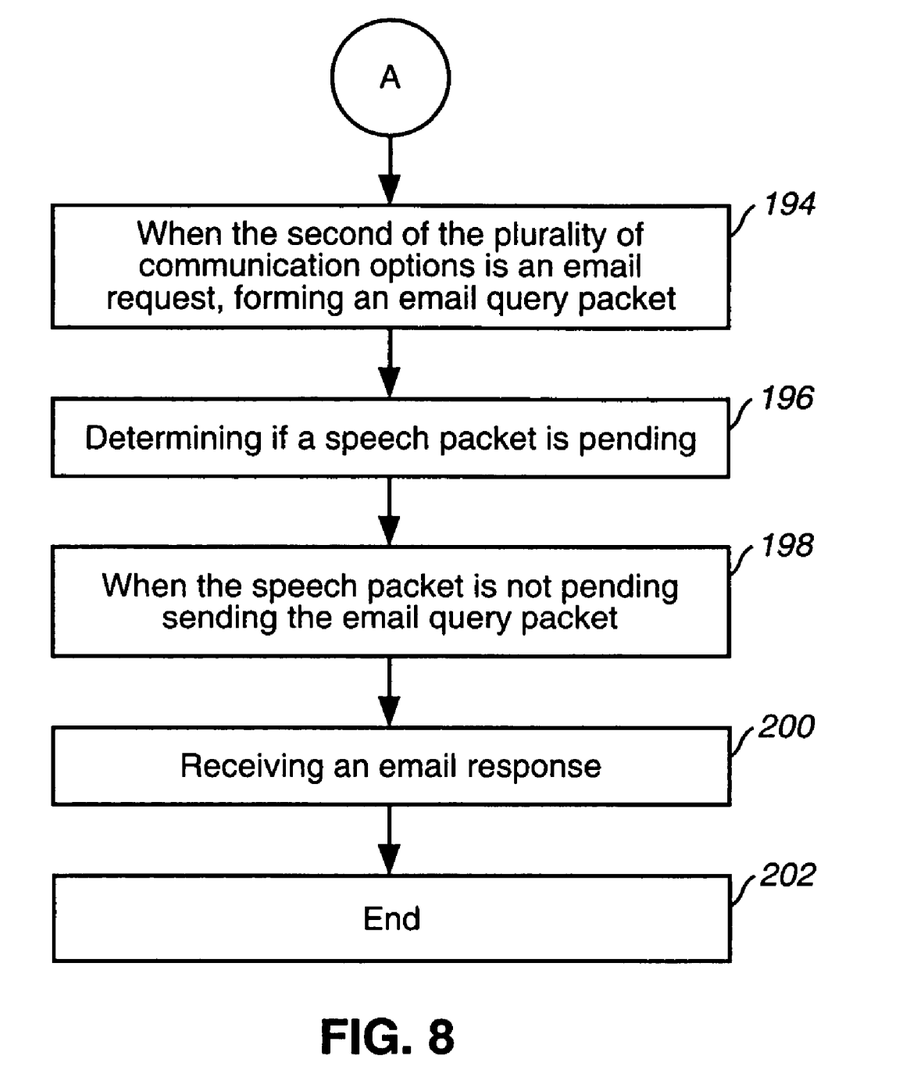

FIGS. 7 & 8 are a flow chart of the steps used in a home office communication system in accordance with another embodiment of the invention. The process starts, step 180, by establishing a communication link between a home modem and an office modem at step 182. Next, one of a plurality of communication options is selected at step 184. A second of the plurality of communication options is selected at step 186. When the one of the plurality of communication options is a telephone conversation, a voice channel is established over the communication link at step 188. A user's voice is digitized to form a digitized voice signal at step 190. In one embodiment the digitized voice signal is compressed. At step 192, the digitized voice signal is packetized to form a plurality of voice packets. Each of the plurality of voice packets includes a speech tag. When the second of the plurality of communication options is an email request an email query packet is formed at step 194. Next, it is determined if a speech packet is pending at step 196. When the speech packet is not pending, the email query is sent at step 198. At step 200, an email response is received, which ends the process at step 202.

In one embodiment the user requests a directory listing having a plurality of names before establishing a communication link. The user then selects one of the plurality of names. The system automatically dials a telephone number associated with the selected name.

In another embodiment the user selects an email request as the second of the communication options. The system forms an email query packet. The system is designed to send voice packets first, so the email query packet will only be sent when no voice packets are pending transmission. The system will then receive an email response that contains a header of all new emails in a user's email box.

In another embodiment the second communication option is an incoming telephone call. The system uses a speaker verification module to determine the identity of the caller. The system then selects a file associated with the caller.

In yet another embodiment the second communication option is a second telephone conversation. The system establishes a second voice channel over the communication link.

In yet another embodiment the user selects a shared white-boarding application The home system transmits a start white-boarding request to a target computer. The home system receives an acknowledgment from the target computer.

Figure 9:
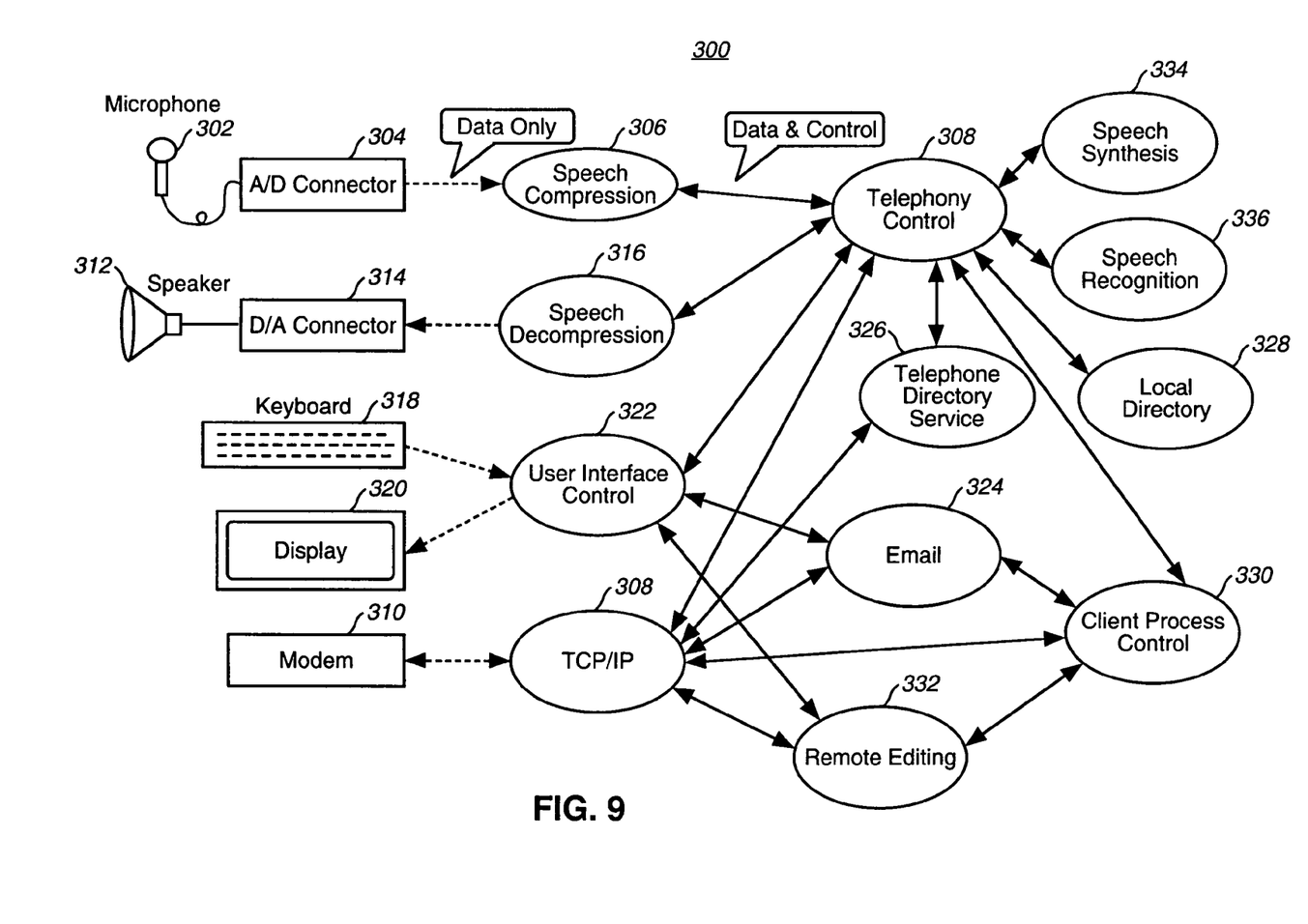
FIG. 9 is a schematic diagram of a home office communication system in accordance with another embodiment of the invention.

FIG. 9 is a schematic diagram of a home office communication system 300 in accordance with another embodiment of the invention. A microphone 302 is connected to an analog to digital converter 304. The analog to digital converter 304 is connected to a speech compression module 306. A telephone control module 308 packetizes the digitized speech signal. A TCP/IP (Transmission Control Protocol/Internet Protocol) module 308 places the packets of speech into a TCP/IP format. A modem 310 then modulates the TCP/IP signal and transmits the signal over a phone line. Note the modem can be an analog modem, a digital modem or a cable modem. A digital modem is used with Asynchronous Digital Subscriber Lines (ASDL), Digital Subscriber Lines (DSL), Integrated Services Digital Network (ISDN) and other digital telephone formats. A digital modem converts a signal from a local computer formal, such as ethernet, to a digital telephone format such as ISDN.

A speaker 312 is connected to a digital to analog converter 314. The digital to analog converter 314 converts an incoming digital speech signal into an analog speech signal. A speech decompression module 316 expands an incoming compressed speech signal.

A user interface including a keyboard 318 and a display 320 are connected to a user interface control module 322. The user interface allows a user to access an email module 324, a telephone directory 326, and a local directory 328. A client process control module 330 and remoting editing module 332 allows the home system to act a server.

A speech synthesis module 334 is used for automated telephone receptionist features. A speech recognition module 336 is used as an alternative user interface, allowing a user to voice commands to the computer.

The methods described herein can be implemented as computer-readable instructions stored on a computer-readable storage medium that when executed by a computer will perform the methods described herein.

Thus there has been described a home office communication system that allows a user to receive email messages, voice mail messages, faxes and have a telephone conversation with a co-worker over a single telephone connection.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A home office communication system wherein a base office comprises:
   a router connected to a base modem;
   a telephone interface connected to the router; and
   a gateway connected to the router, wherein the router, telephone interface and gateway are all customer premises equipment located at a single location.

2. The home office system of claim 1, wherein the base modem is connected through the public switched telephone network to a remote modem.

3. The home office communication system of claim 1, further including a local area network connected to the gateway.

4. The home office communication system of claim 3, further including an email server connected to the local area network.

5. The home office communication system of claim 4, further including an integrated messaging center connected to the local area network the integrated messaging center connected to the email server, a voice mail system and a facsimile server.

6. The home office communication system of claim 5, further wherein the integrated messaging center extracts a header information from the email server, the voice mail system and the facsimile server.

7. The home office communication system of claim 6, further wherein the header information from the facsimile server includes a sender's name and a sender's telephone number.

8. The home office communication system of claim 3, further including an user's computer connected to the local area network, wherein the user's computer and the control and display system are capable of running a shared white-boarding application.

9. The home office communication system of claim 3, further including a project server connected to the local area network.

10. The home office communication system of claim 1, further including a telephone switch connected to the telephone interface.

11. The home office communication system of claim 10, wherein the telephone switch is connected to a voice mail system.

12. The home office communication system of claim 10, wherein the telephone switch is connected to a facsimile server.

13. The home office communication system of claim 1, wherein the router routes a packet of the plurality of outgoing data streams to the telephone interface when the packet includes the speech tag.

14. A method of operating a home office communication system comprising the steps of:
   (a) establishing a communication link between a home modem and an office modem;
   (b) selecting one of a plurality of communication options;
   (c) selecting a second of the plurality of communication options;
   (d) when the one of the plurality of communication options, is an email request, forming an email query packet;
   (e) determining if a speech packet is pending;
   (f) when the speech packet is not pending sending the email query packet.

15. The method of claim 14, further including the steps of:
   (g) when the one of the plurality of communication options is a telephone conversation, establishing a voice channel over the communication link;
   (h) digitizing a user's voice to form a digitized voice signal; and
   (i) packetizing the digitized voice signal to form a plurality of voice packets, each of the plurality of voice packets including a speech tag.

16. The method of claim 15, wherein step (h) further includes the step of:
   (h1) compressing the digitized voice signal.

17. The method of claim 15, wherein step (g) further includes the steps of:
   (g1) requesting a directory listing having a plurality of names
   (g2) selecting one of the plurality of names;
   (g3) dialing a telephone number associated with one of the plurality of names.

18. The method of claim 15, further including the step of:
   (j) receiving an email option.

19. The method of claim 14, further including the steps of:
   (g) when the second of the plurality of communication options is an incoming telephone call, analyzing a caller's speech to recognize the caller;
   (h) selecting a file associated with the caller.

20. The method of claim 14, further including the step of:
   (g) when the second of the plurality of communication options is a telephone conversation, establishing a second voice channel over the communication link.

21. The method of claim 14, further including the steps of:
   (g) when the second of the plurality of communication options is a shared white-boarding application, transmitting a start white-boarding request to a target computer;
   (h) receiving an acknowledgement from the target computer.

* * * * *

UNITED STATES PATENT AND TRADEMARK OFFICE
CERTIFICATE OF CORRECTION

| | | |
|---|---|---|
| PATENT NO. | : 7,116,762 B2 | Page 1 of 1 |
| APPLICATION NO. | : 09/789421 | |
| DATED | : October 3, 2006 | |
| INVENTOR(S) | : Raymond Walden Bennett, III et al. | |

It is certified that error appears in the above-identified patent and that said Letters Patent is hereby corrected as shown below:

Col. 6, line 44 after "(g1) requesting...having a plurality of names" insert --;--.

Signed and Sealed this

Twentieth Day of February, 2007

JON W. DUDAS
*Director of the United States Patent and Trademark Office*